US012609975B2

(12) United States Patent
Kim et al.

(10) Patent No.: US 12,609,975 B2
(45) Date of Patent: Apr. 21, 2026

(54) VIDEO CONFERENCE SYSTEM INTERLINKING METHOD, APPARATUS, SYSTEM, AND COMPUTER PROGRAM

(71) Applicant: SAMSUNG SDS CO., LTD., Seoul (KR)

(72) Inventors: Youngkwang Kim, Seoul (KR); Myounghee Park, Seoul (KR); Soohwan Park, Seoul (KR); Hyesu Lee, Seoul (KR); Kihwan Kwon, Seoul (KR); Dohyung Im, Seoul (KR); Junho Kang, Seoul (KR); Heetae Yoon, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 114 days.

(21) Appl. No.: 18/495,061

(22) Filed: Oct. 26, 2023

(65) Prior Publication Data

US 2024/0146780 A1 May 2, 2024

(30) Foreign Application Priority Data

Oct. 28, 2022 (KR) ........................ 10-2022-0141070

(51) Int. Cl.
*H04L 65/401* (2022.01)
*G06F 3/16* (2006.01)

(52) U.S. Cl.
CPC ............ *H04L 65/401* (2022.05); *G06F 3/165* (2013.01)

(58) Field of Classification Search
CPC ............... H04L 65/403; H04L 12/1818; H04L 65/1093; H04L 51/046; H04L 65/401; H04N 7/15; H04N 21/2368
See application file for complete search history.

(56) References Cited

U.S. PATENT DOCUMENTS

| | | | | |
|---|---|---|---|---|
| 8,405,705 | B2 * | 3/2013 | Asthana | H04L 12/18 |
| | | | | 348/14.09 |
| 9,020,119 | B2 * | 4/2015 | Colbert | H04M 3/566 |
| | | | | 379/202.01 |
| 9,106,716 | B2 * | 8/2015 | Zhou | H04L 65/1026 |
| 9,426,422 | B2 * | 8/2016 | Gandhi | G06F 1/1684 |
| 9,596,433 | B2 * | 3/2017 | Decker | H04L 65/1069 |
| 9,742,830 | B2 * | 8/2017 | Thapa | H04L 65/4038 |
| 10,805,471 | B1 * | 10/2020 | Utley | H04M 3/56 |
| 11,171,795 | B2 * | 11/2021 | VanBlon | H04L 12/1822 |
| 11,282,537 | B2 * | 3/2022 | Chakra | G10L 25/78 |
| 11,431,764 | B2 * | 8/2022 | Bugbee | H04L 65/1089 |

(Continued)

FOREIGN PATENT DOCUMENTS

KR 10-2016-0069271 A 6/2016

*Primary Examiner* — Alex Tran
(74) *Attorney, Agent, or Firm* — NSIP Law

(57) ABSTRACT

A processor-implemented method of interlinking a first video conference system and a second video conference system for combining and transmitting voice signals of a plurality of users in a video conference system interlinking apparatus including a plurality of video sharing units including receiving second video conference data of a plurality of users from the second video conference system and transmitting voice data including combined voices of two or more users, among the transmitted second video conference data, through a single one of the plurality of video sharing units.

20 Claims, 12 Drawing Sheets

(56)                References Cited

U.S. PATENT DOCUMENTS

| | | | | |
|---|---|---|---|---|
| 11,683,444 | B2 * | 6/2023 | John | G06Q 50/01 |
| | | | | 348/14.08 |
| 12,159,083 | B2 * | 12/2024 | Wu | H04N 7/147 |
| 2023/0328203 | A1 * | 10/2023 | Chen | G10L 15/26 |
| 2024/0022687 | A1 * | 1/2024 | Yang | H04L 65/403 |

* cited by examiner

MULTIPOINT CONFERENCING UNIT

SELECTIVE FORWARDING UNIT

START

RECEIVE SECOND VIDEO CONFERENCE DATA OF
PLURALITY OF USERS FROM SECOND VIDEO
CONFERENCE SYSTEM    —S110

TRANSMIT VOICE DATA IN WHICH VOICES OF
TWO OR MORE USERS ARE COMBINED, AMONG
TRANSMITTED SECOND VIDEO CONFERENCE DATA,
ONLY THROUGH ONE OF PLURALITY OF
VIDEO SHARING UNITS    —S120

END

FIG. 11

WIRED OR WIRELESS NETWORK

VIDEO CONFERENCE SYSTEM INTERLINKING METHOD, APPARATUS, SYSTEM, AND COMPUTER PROGRAM

CROSS-REFERENCE TO RELATED APPLICATION

This application claims the benefit under 35 U.S.C. 119 of Korean Patent Application No. 10-2022-0141070, filed on Oct. 28, 2022, in the Korean Intellectual Property Office, the entire disclosure of which is incorporated herein by reference for all purposes.

BACKGROUND

1. Field of the Invention

The present disclosure relates to a video conference system interlinking method, apparatus, system, and computer program and, more specifically, to a video conference system interlinking method, apparatus, system, and computer program capable of effectively solving various problems such as limitations, errors, and the like in video and voice, which may occur when interlinking a plurality of video conference systems.

2. Description of the Related Art

Recently, in line with the development of information and communication technology, various online video conference systems have been widely used.

More specifically, commercial services providing video conference use a multi-point control unit (MCU) method and a selective forwarding unit (SFU) method.

Here, as shown in FIGS. 1A and 1B, a relay server in the MCU method combines the videos and voices of other participants and transmits the same to the respective participants of the video conference, thereby reducing traffic, and a relay server in the SFU method selectively and individually transmits the videos and voices to be delivered to the respective participants, so that traffic may increase but so that the respective participants are able to freely receive and utilize the videos and voices.

However, in the prior art, interlinking and providing a plurality of video conferences between video conference systems may cause various problems.

More specifically, as shown in FIGS. 2A and 2B, there was a restriction in which only the video of an active speaker is shared while combining and sharing the voices of multiple participants for interlinking a plurality of video conference systems (FIG. 2A) or in which, in order to share the videos of two or more participants, the area of one video is divided and the videos of multiple participants are separately arranged therein (FIG. 2B).

However, in this method, participants in other conference systems can only see the video of the active speaker, instead of seeing the videos of the remaining participants in other conference systems, and arrangement of the videos of multiple participants in the area obtained by dividing a limited area may cause problems with the size and quality of each video and the inconvenience of not being able to freely arrange the respective videos separately.

Furthermore, when a plurality of video conferences is interlinked and provided between a plurality of conference systems, problems may occur in voices such as an echo, as well as videos.

Accordingly, there is a demand for a method to solve various problems such as limitations, errors, and the like in video and voice, which may occur when interlinking a plurality of video conference systems, but an effective solution thereof has not yet been proposed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, here is provided a processor-implemented method of interlinking a first video conference system and a second video conference system for combining and transmitting voice signals of a plurality of users in a video conference system interlinking apparatus including a plurality of video sharing units including receiving second video conference data of a plurality of users from the second video conference system and transmitting voice data including combined voices of two or more users, among the transmitted second video conference data, through a single one of the plurality of video sharing units.

The transmitting may include transmitting both video data and voice data of a specific user of the plurality of users, among the second video data of, to the first video conference system and transmitting video data of remaining users, among the second video conference data, to the first video conference system.

The transmitting may include transmitting second active speaker video conference data including video data and voice data of an active speaker among the plurality of users of the second video conference system to the first video conference system by a primary voice/video interlinking unit among the plurality of video sharing units and transmitting second additional user video conference data, the second additional user video conference data including video data of speakers other than the active speaker among the plurality of users of the second video conference system and does not include voice data thereof, to the first video conference system by a secondary video interlinking unit among the plurality of video sharing units.

Each of the primary voice/video interlinking unit and the secondary video interlinking unit may be or serve as a video conference device participating in a video conference of the second video conference system.

The method may include transmitting, by the primary voice/video interlinking unit, secondary additional video conference data, the secondary additional video conference data including video data of speakers other than the active speaker among the plurality of users of the second video conference system and does not include voice data thereof, to the first video conference system.

The method may include transmitting, by the secondary video interlinking unit, secondary additional video conference data, the secondary additional video conference data including video data of speakers other than the active speaker among the plurality of users of the second video conference system, to the first video conference system.

When the active speaker is changed in the second video conference system, the second active speaker video conference data interlinked with the primary voice/video interlinking unit may also be changed according to the changed active speaker.

The method may include transmitting, by the video conference system interlinking apparatus, first video conference data of a plurality of users provided from the first video conference system.

The transmitting of the first video conference data may include transmitting first active video conference data including video data and voice data of an active speaker among the plurality of users of the first video conference system to the second video conference system by a primary voice/video interlinking unit among the plurality of video sharing units and transmitting first additional video conference data, the first additional video conference data including video data of speakers other than the active speaker among the plurality of users of the first video conference system and does not include voice data thereof, to the second video conference system by a secondary video interlinking unit among the plurality of video sharing units.

In the transmitting of the first additional video conference data, the speakers other than the active speaker among the plurality of users of the first video conference system are muted.

The primary voice/video interlinking unit may serve as or be a first active video conference device for active speakers of the first video conference system and the second video conference system, and the secondary video interlinking unit may be or serve as a first additional video conference device for speakers other than the active speakers of the first video conference system and the second video conference system.

The method may include transmitting first combined video conference data, by the primary voice/video interlinking unit, the first combined video conference data including the video data and voice data of the active speaker and first additional video data and voice data of speakers other than the active speaker of the first video conference system, among the first video conference data, to the second video conference system.

The method may include transmitting, by the secondary video interlinking unit, first additional speaker video conference data, the first additional speaker video conference data including video data of speakers other than the active speaker among the plurality of users of the first video conference system and does not include voice data thereof, to the second video conference system.

In a general aspect, here is provided a non-transitory, computer-readable storage medium storing instructions that, when executed by one or more processors, configure the one or more processors to perform instructions, one or more of the processors are provided in an apparatus including a plurality of video sharing units where the included one or more processors perform operations of interlinking a first video conference system and a second video conference system for combining and transmitting voice signals of a plurality of users, and the instructions may include receiving second video conference data of a plurality of users from the second video conference system and transmitting voice data including combined voices of two or more users, among the transmitted second video conference data, through a single one of the plurality of video sharing units.

In a general aspect, here is provided a video conference system interlinking apparatus including a processor configured to execute instructions and a memory storing the instructions, the apparatus being configured to interlink a primary video conference system and a secondary video conference system for combining and transmitting voice signals of a plurality of users, and including a plurality of video sharing units, and execution of the instructions configures the processor to receive second video conference data of a plurality of users from the secondary video conference system and transmit voice data including combined voices of two or more users, among the transmitted second video conference data, through a single one of the plurality of video sharing units.

The video conference system interlinking apparatus may include a primary voice/video interlinking unit among the plurality of video sharing units, the primary voice/video interlinking unit being configured to transmit primary video conference data including primary active video data and voice data of an active speaker among the plurality of users of the primary video conference system to the secondary video conference system and a secondary video interlinking unit among the plurality of video sharing units, the secondary video interlinking unit being configured to transmit secondary video conference data, the secondary video conference data including second additional video data of speakers other than the active speaker among the plurality of users of the second video conference system and does not include voice data thereof, to the primary video conference system.

Each of the primary voice/video interlinking unit and the secondary video interlinking unit may be or serves as a video conference device participating in a video conference of the primary video conference system.

The primary voice/video interlinking unit may be configured to transmit primary combined video conference data including video data and voice data of the active speaker and voice data of speakers other than the active speaker of the primary video conference system, among primary video conference data of the plurality of users received from the primary video conference system, to the secondary video conference system.

The primary video interlinking unit is configured to transmit primary additional video conference data including video data of speakers other than the active speaker among the plurality of users of the primary video conference system and does not include voice data thereof, to the secondary video conference system.

The instructions may include receiving primary video conference data of a plurality of users from the primary video conference system.

BRIEF DESCRIPTION OF THE DRAWINGS

FIGS. 1A, 1B, 2A and 2B are diagrams illustrating video conference systems according to the prior art.

FIG. 11 is a block diagram of a video conference system interlinking apparatus according to an embodiment of the present disclosure.

Figure 1A:
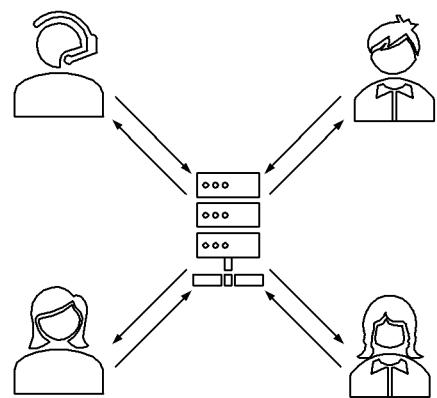
Figure 1B:
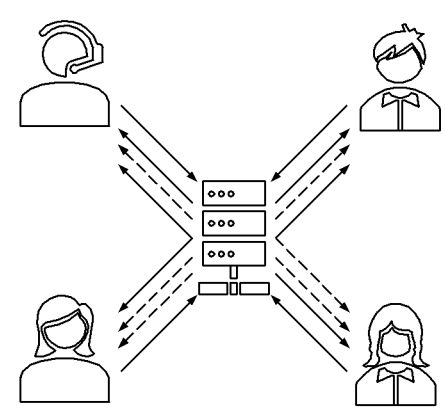

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are famed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular foils "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, exemplary embodiments of a video conference system interlinking method, apparatus, system, and computer program according to the present disclosure will be described in detail with reference to the accompanying drawings.

Figure 3:
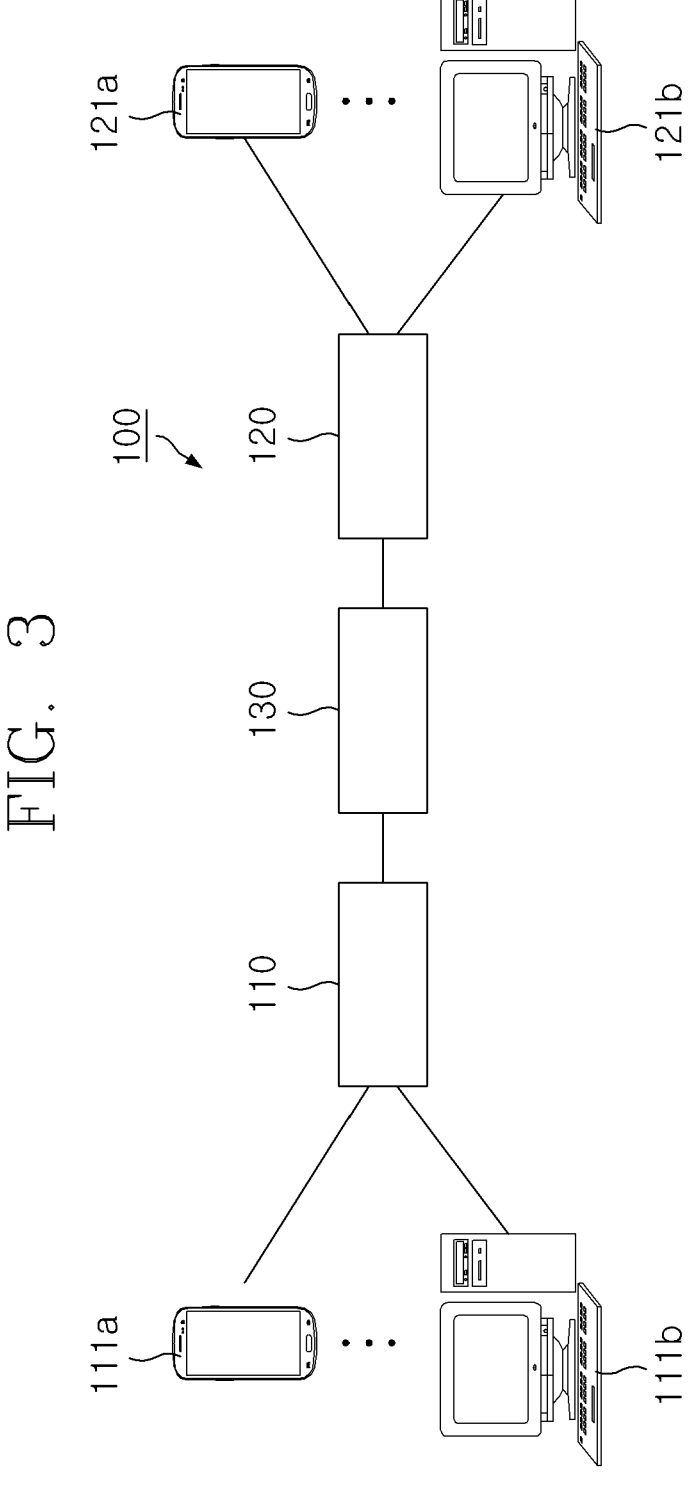
FIG. 3 is a diagram illustrating a video conference system according to an embodiment of the present disclosure.

First, FIG. 3 illustrates the configuration of a video conference system 100 according to an embodiment of the present disclosure. As shown in FIG. 3, the video conference system 100 according to an embodiment of the present disclosure may be configured to include a first video conference system 110, a second video conference system 120 that combines and transmits voice signals of a plurality of users, and a video conference system interlinking apparatus 130 for interlinking the first video conference system 110 and the second video conference system 120.

In this case, the first video conference system 110 is a video conference system capable of providing a video conference to a plurality of video conference devices 111*a* and 111*b*, and may be a selective forwarding unit (SFU)-type video conference system, but the present disclosure is not necessarily limited thereto.

In addition, the second video conference system 120 is a video conference system capable of providing a video conference to a plurality of video conference devices 121*a* and 121*b*, and may be a multi-point control unit (MCU)-type video conference system for combining and transmitting voice signals of a plurality of users, but the present disclosure is not necessarily limited thereto.

In addition, the video conference system interlinking apparatus 130 interlinks the first video conference system 110 and the second video conference system 120, enabling participants of the first video conference system 110 can interact with the second video conference system 120 to attend the second video conference system 120 or enabling participants of the second video conference system 120 to attend the first video conference system 110.

In this case, the video conference system interlinking apparatus 130 may be implemented using one or more servers, but the present disclosure is not necessarily limited thereto, and in addition, the video conference system interlinking apparatus 130 may be implemented in various forms such as a dedicated device, a process driven in a device such as a server, and the like.

In addition, in FIG. 3, the first video conference system 110, the second video conference system 120, and the video conference system interlinking apparatus 130 may be connected through a communication network, and as the communication network, a wired network and a wireless network may be used. Specifically, the communication network may include various communication networks such as a local area network (LAN), a metropolitan area network (MAN), a wide area network (WAN), and the like. In addition, the communication network may include the well-known World Wide Web (WWW).

In addition, in the present disclosure, the video conference system interlinking apparatus 130 of the video conference system 100 is not necessarily connected to the first video conference system 110 and the second video conference system 120 through the communication network, and they may be implemented in various forms such as a configuration in which the video conference system interlinking apparatus 130 is integrally configured with the first video conference system 110 or the second video conference system 120.

Figure 4:
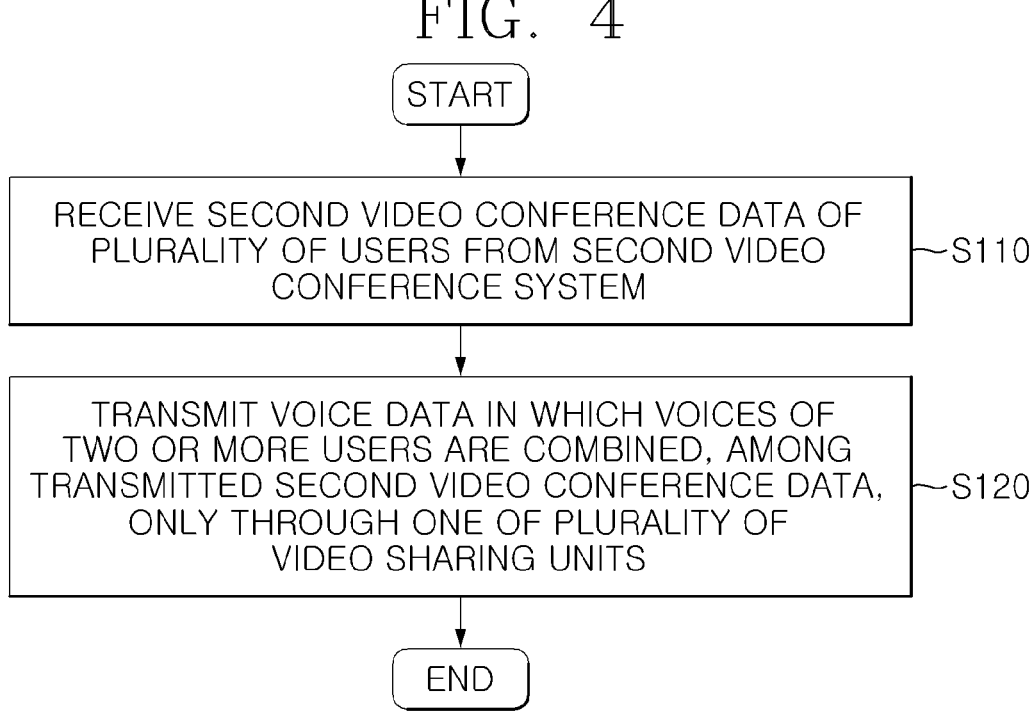
FIG. 4 is a flowchart illustrating a video conference system interlinking method according to an embodiment of the present disclosure.

In addition, as shown in FIG. 4, the video conference system interlinking method according to an embodiment of the present disclosure may be performed by one or more processors in a video conference system interlinking apparatus 130 including a plurality of video sharing units 131 and 132 and may be a method of interlinking the first video conference system 110 and the second video conference system 120 that combines and transmits voice signals of a plurality of users, which includes receiving second video conference data of a plurality of users from the second video conference system 120 (S110) and transmitting voice data in which voices of two or more users are combined, among the transmitted second video conference data, only through one of the plurality of video sharing units 131 and 132 (S120).

Figures 2A, 2B:
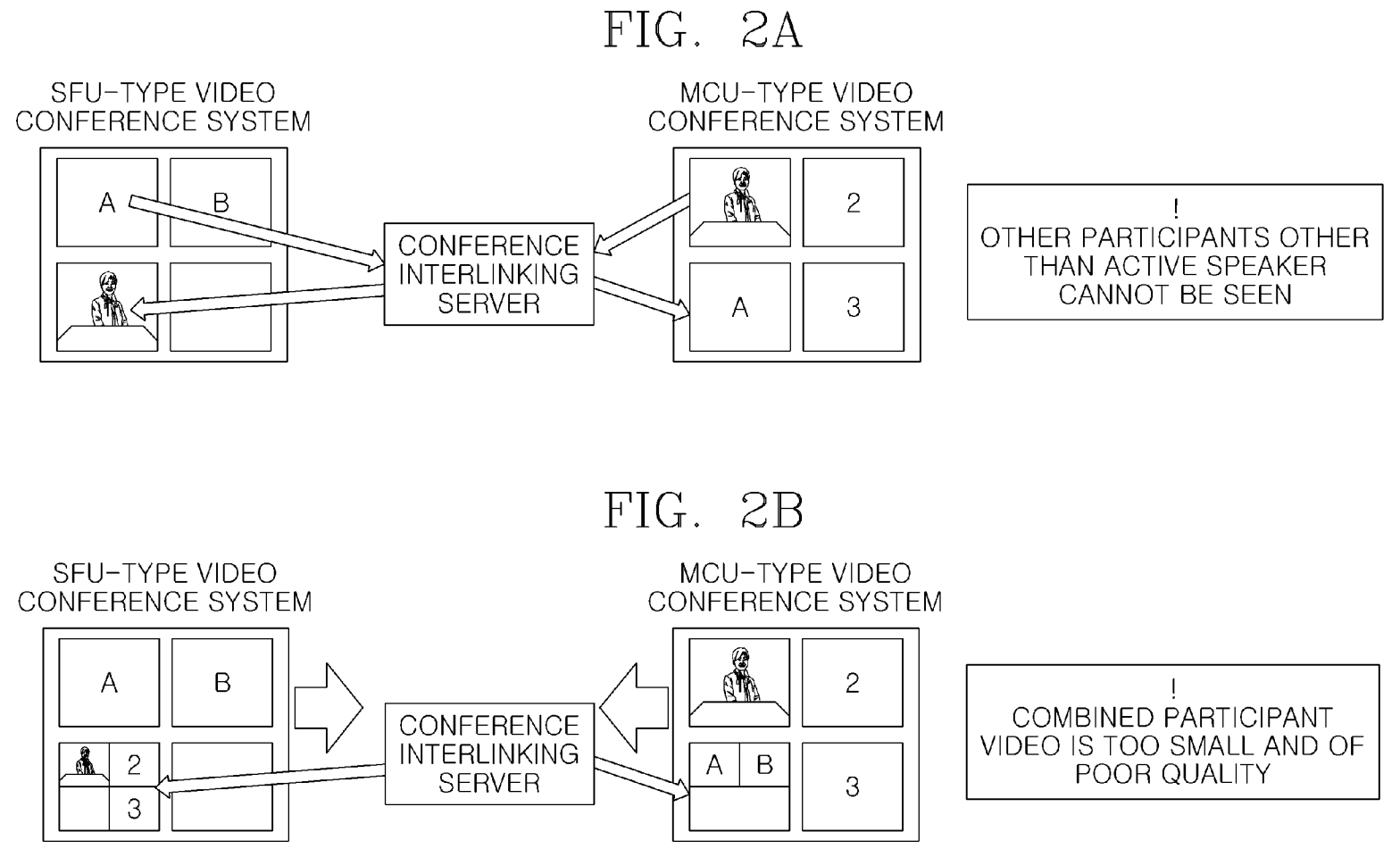

The method shown in FIGS. 2A and 2B may be performed by, for example, the video conference system interlinking apparatus 130, and the video conference system interlinking apparatus 130 may be implemented to include a computing device described below with reference to FIG. 12. For example, the video conference system interlinking apparatus 130 may include a processor 10, and the processor 10 may perform resource distribution by executing an instruction configured to implement an operation for performing resource distribution.

In this case, in the transmitting S120, the video conference system interlinking apparatus 130 may transmit both video data and voice data of a specific user of the plurality of users, among the second video conference data, to the first video conference system 110 and transmit video data of the remaining users, among the second video conference data, to the first video conference system 110.

In addition, in the transmitting S120, a primary voice/video interlinking unit 131 among the plurality of video sharing units 131 and 132 may transmit video conference data including video data and voice data of an active speaker among the plurality of users of the second video conference system 120 to the first video conference system 110, and a secondary video interlinking unit 132 among the plurality of video sharing units 131 and 132 may transmit video conference data, which includes video data of speakers other than the active speaker among the plurality of users of the second video conference system 120 and does not include voice data thereof (i.e., the other speakers of the second video conference system are muted), to the first video conference system 110. In additional examples, where the transmitted data does not include voice data, these users may be considered to be muted. In another example, in the muting of the other speakers and/or participants in different video conference systems, the respective voice data may not be transmitted.

In this case, each of the primary voice/video interlinking unit 131 and the secondary video interlinking unit 132 may serve as a video conference device 121 participating in the video conference of the second video conference system 120.

In addition, the primary voice/video interlinking unit 131 may transmit video conference data including both video data of the active speaker and voice data of the active speaker and speakers other than the active speaker of the second video conference system 120, among video conference data of the plurality of users received from the second video conference system 120, to the first video conference system 110.

In this case, the secondary video interlinking unit 132 may transmit video conference data, which includes video data of speakers other than the active speaker among the plurality of users of the second video conference system 120 and does not include voice data thereof, to the first video conference system 110.

In addition, the video conference system interlinking method according to an embodiment of the present disclosure may further include transmitting first video conference data of a plurality of users provided from the first video conference system 110 by the video conference system interlinking apparatus 130 (not shown).

Here, in the transmitting of the first video conference data (not shown), the primary voice/video interlinking unit 131 among the plurality of video sharing units 131 and 132 may transmit video conference data including video data and voice data of an active speaker among a plurality of users of the first video conference system 110 to the second video conference system 120, and the secondary video interlinking unit 132 among the plurality of video sharing units 131 and 132 may transmit video conference data, which includes video data of speakers other than the active speaker among the plurality of users of the first video conference system 110 and does not include voice data thereof, to the second video conference system 120.

In addition, each of the primary voice/video interlinking unit 131 and the secondary video interlinking unit 132 may serve as a video conference device 111 participating in a video conference of the first video conference system 110.

In addition, the primary voice/video interlinking unit 131 may serve as video conference devices 111 and 121 for the active speakers of the first video conference system 110 and the second video conference system 120, and the secondary video interlinking unit 132 may serve as video conference devices 111 and 121 for speakers other than the active speakers of the first video conference system 110 and the second video conference system 120.

In addition, the primary voice/video interlinking unit 131 may transmit video conference data including both video data of the active speaker and voice data of the active speaker and speakers other than the active speaker of the first video conference system 110, among video conference data of the plurality of users received from the first video conference system 110, to the second video conference system 120.

In addition, the secondary video interlinking unit 132 may transmit video conference data, which includes video data of speakers other than the active speaker among the plurality of users of the first video conference system 110 and does not include voice data thereof, to the second video conference system 120.

In addition, if the active speaker is changed in the second video conference system 120, the video conference data interlinked with the primary voice/video interlinking unit 131 may also be changed according to the changed active speaker.

Accordingly, in the video conference system interlinking method, apparatus, system, and computer program according to an embodiment of the present disclosure, it is possible to effectively solve various problems such as limitations, errors, and the like in video and voice, which may occur when interlinking a plurality of video conference systems.

Hereinafter, the video conference system interlinking method, apparatus, system, and computer program according to an embodiment of the present disclosure will be described in more detail with reference to FIGS. 3 and 4.

First, in S110, the video conference system interlinking apparatus 130 including a plurality of video sharing units 131 and 132 receives second video conference data of a plurality of users from the second video conference system 120.

In this case, the second video conference data may include video data and voice data of a plurality of users of the video conference devices 121*a* and 121*b* participating in the second video conference system 120.

More specifically, the primary voice/video interlinking unit 131 and the secondary video interlinking unit 132 among the plurality of video sharing units 131 and 132 of the video conference system interlinking apparatus 130 may receive the second video conference data of the plurality of users from the second video conference system 120.

Figure 5:
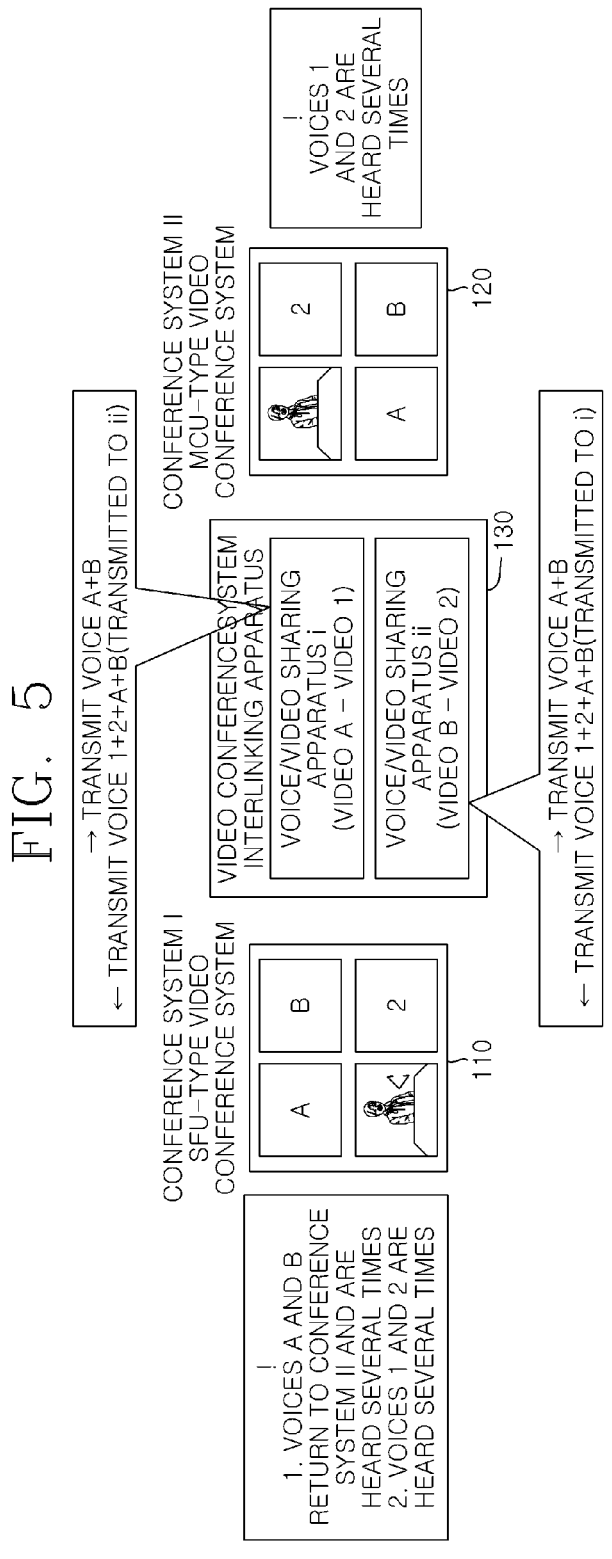
FIGS. 5 to 10 are diagrams illustrating specific operations of a video conference system interlinking method according to an embodiment of the present disclosure.

In this case, as shown in FIG. 5, in the video conference system interlinking method, apparatus, and system according to an embodiment of the present disclosure, the video conference system interlinking apparatus 130 may receive first video conference data of a plurality of users from the first video conference system 110.

However, as shown in FIG. 5, in the case where the video conference system interlinking apparatus 130 transmits first video conference data (e.g., video data of user A and voice data of users A and B, and video data of user B and voice data of users A and B in FIG. 5) of a plurality of users (e.g., users A and B in FIG. 5) from the first video conference system 110 to the second video conference system 120 and transmits second video conference data (e.g., video data of user 1, voice data of users 1 and 2, and the transmitted voice data of users A and B, and video data of user 2, voice data of users 1 and 2, and the transmitted voice data of users A and B in FIG. 5) of a plurality of users (e.g., users 1 and 2 in FIG. 5) from the second video conference system 120 to the first video conference system 110, the voices of users A and B may be heard repeatedly in the second video conference system 120, and the voices of users A and B and users 1 and 2 may be heard several times in the first video conference system 110.

That is, as shown in FIG. 5, in the second video conference system 120 (conference system II in FIG. 5) that combines and transmits the voices of users participating in the video conference and the voices of other users, such as an MCU-type video conference system, if the first video conference system 110 (conference system I in FIG. 5) shares videos and voices of a plurality of users using a plurality of voice/video sharing devices i and ii, the voice of the user of the conference system I may be transmitted as many times as the number of users attending the conference through the plurality of users for sharing the videos and voices so that the voice of each user of the conference system I may be heard repeatedly in the conference system II, and furthermore, the speaker of the conference system I may hear his or her own voice or may hear the voices of other participants of the conference system I several times, causing a congestion problem in which voices overlap and hindering an efficient meeting.

In this regard, in the video conference system interlinking method according to an embodiment of the present disclosure, voice data in which voices of two or more users are combined, among the transmitted second video conference data, is transmitted only through one of the plurality of video sharing units 131 and 132 in S120.

More specifically, in the S120, the video conference system interlinking apparatus 130 transmits both video data and voice data of a specific user among the plurality of users, among the second video conference data, to the first video conference system 110 and transmits video data of the remaining users, among the second video conference data, to the first video conference system 110, thereby solving the problem in which voice is repeatedly heard.

Figure 6:
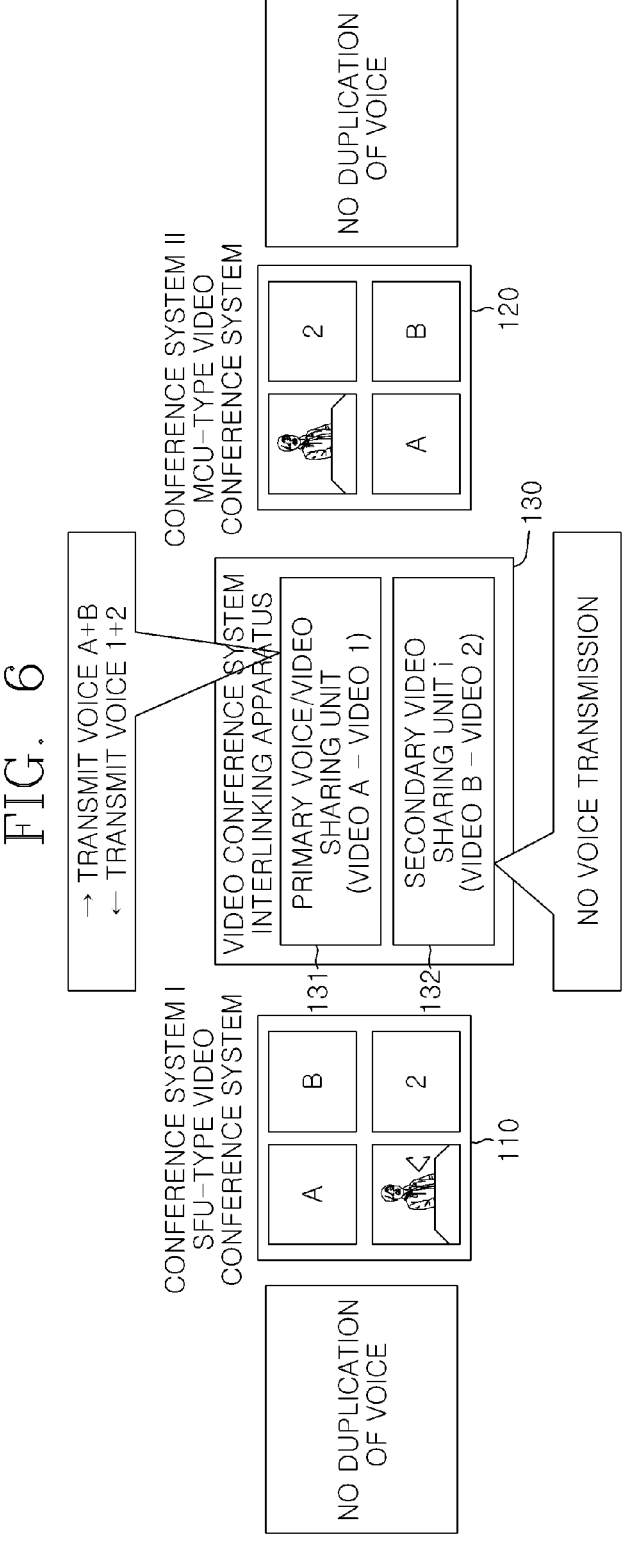

More specifically, as shown in FIG. 6, in the video conference system interlinking method according to an embodiment of the present disclosure, in the S120, the primary voice/video interlinking unit 131 among the plurality of video sharing units 131 and 132 may transmit video conference data including both video data and voice data of an active speaker among a plurality of users of the second video conference system 120 to the first video conference system 110, and the secondary video interlinking unit 132 among the plurality of video sharing units 131 and 132 may transmit video conference data, which includes video data of speakers other than the active speaker among the plurality of users of the second video conference system 120 and does not include voice data thereof, to the first video conference system 110, thereby effectively preventing the problem in which voice is repeatedly heard in the first video conference system 110 and the second video conference system 120.

To this end, in the video conference system interlinking method according to an embodiment of the present disclosure, as shown in FIG. 6, the video conference system interlinking apparatus 130 may include one primary voice/video sharing unit 131 and the remaining n secondary video sharing units 132. In this case, it is possible to share the synthesized voice of the other party only through the primary voice/video sharing unit 131, and the video may also be shared through the primary voice/video sharing unit 131. Accordingly, the video of an active speaker of the counterpart video conference system may be transmitted or the video of a general participant may be shared through the primary voice/video sharing unit 131. On the other hand, only the general participants' videos may be shared with each other through the secondary video sharing units 132.

In addition, the primary voice/video sharing unit 131 should transmit and receive voices symmetrically between both video conference systems, whereas the videos of the primary voice/video sharing unit 131 and the secondary video sharing units 132 may also be shared asymmetrically.

As a more specific example, in the video conference system interlinking method according to an embodiment of the present disclosure, as shown in FIG. 6, the primary voice/video interlinking unit 131 may transmit video data of an active speaker (e.g., user A in FIG. 6) of the first video conference system 110 and voice data of the active speaker and speakers other than the active speaker (e.g., voice data of users A and B in FIG. 6) to the second video conference system 120, and the secondary video interlinking unit 132 may transmit video conference data, which includes video data of speakers (e.g., user B in FIG. 6) other than the active speaker of the first video conference system 110 and does not include voice data thereof, to the second video conference system 120.

Subsequently, as shown in FIG. 6, the primary voice/video interlinking unit 131 may transmit video data of an active speaker (e.g., user 1 in FIG. 6) of the second video conference system 120 and voice data of the active speaker and speakers other than the active speaker (e.g., voice data of users 1 and 2 in FIG. 6) to the first video conference system 110, and the secondary video interlinking unit 132 may transmit video conference data, which includes video data of speakers (e.g., user 2 in FIG. 6) other than the active speaker of the second video conference system 120 and does not include voice data thereof, to the first video conference system 110, thereby effectively preventing the problem in which voice is repeatedly heard in the first video conference system 110 and the second video conference system 120.

In this case, each of the primary voice/video interlinking unit 131 and the secondary video interlinking unit 132 may serve as a video conference device 121 participating in a video conference of the second video conference system 120.

In addition, the primary voice/video interlinking unit 131 may transmit video conference data including both video data of the active speaker and voice data of the active speaker and speakers other than the active speaker of the second video conference system 120, among video conference data of a plurality of users received from the second video conference system 120, to the first video conference system 110.

In addition, the secondary video interlinking unit 132 may transmit video conference data, which includes video data of speakers other than the active speaker among the plurality of users of the second video conference system 120 and does not include voice data thereof, to the first video conference system 110.

In addition, each of the primary voice/video interlinking unit 131 and the secondary video interlinking unit 132 may serve as a video conference device 111 participating in a video conference of the first video conference system 110.

Furthermore, the primary voice/video interlinking unit 131 may serve as video conference devices 111 and 121 for the active speakers of the first video conference system 110 and the second video conference system 120, and the secondary video interlinking unit 132 may serve as video conference devices 111 and 121 for speakers other than the active speakers of the first video conference system 110 and the second video conference system 120.

In addition, the primary voice/video interlinking unit 131 may transmit video conference data including both video data of the active speaker and voice data of the active speaker and speakers other than the active speaker of the first video conference system 110, among video conference data of the plurality of users received from the first video conference system 110, to the second video conference system 120.

In addition, the secondary video interlinking unit 132 may transmit video conference data, which includes video data of speakers other than the active speaker among the plurality of users of the first video conference system 110 and does not include voice data thereof, to the second video conference system 120.

Accordingly, in the video conference system interlinking method, apparatus, system, and computer program according to an embodiment of the present disclosure, it is possible to effectively solve various problems such as limitations, errors, and the like in video and voice, which may occur when interlinking a plurality of video conference systems.

Figure 7:
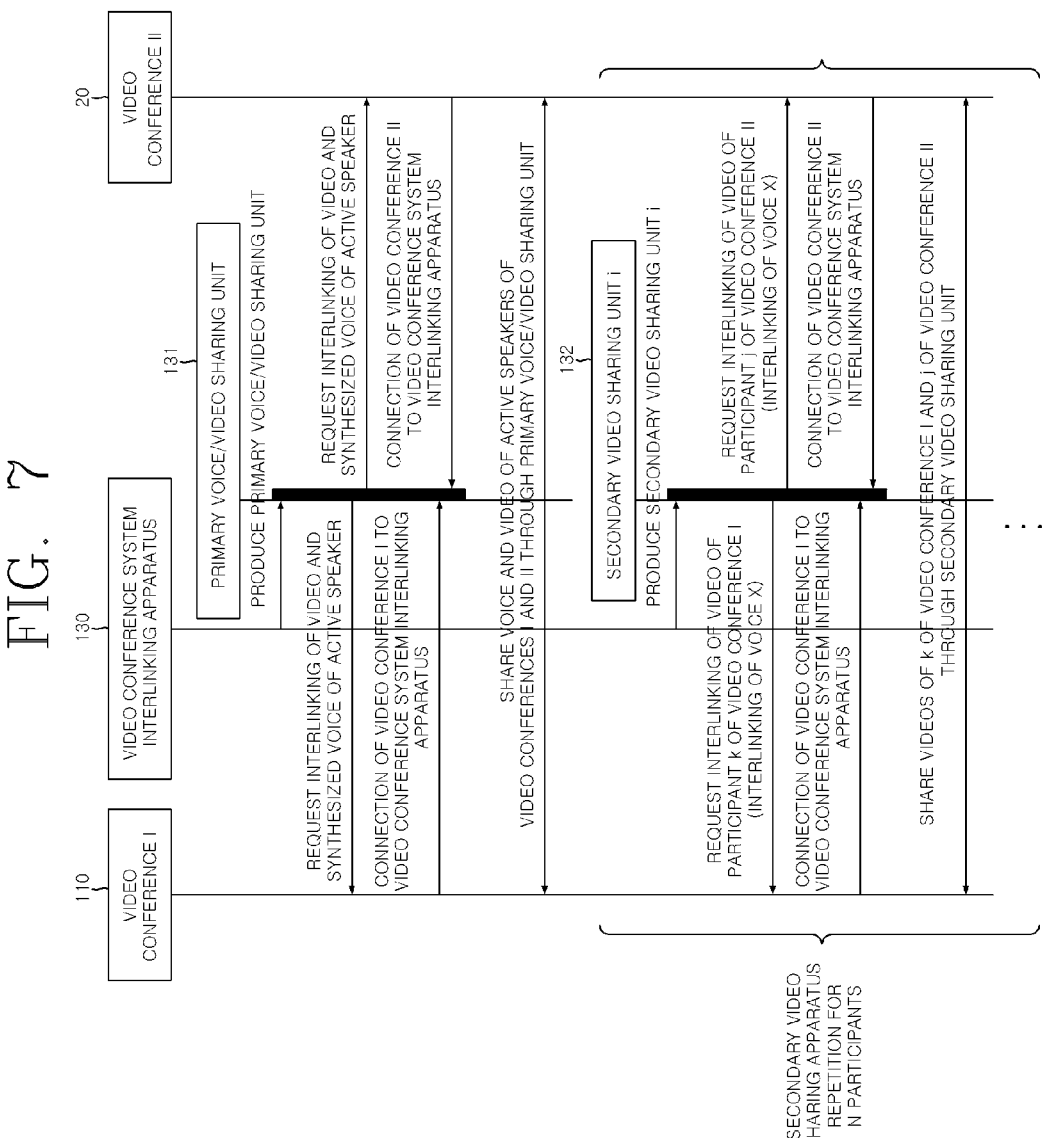

In addition, FIG. 7 illustrates a flowchart showing a specific process in which the first video conference system 110 and the second video conference system 120 operate by interlinking with the video conference system interlinking apparatus 130 in the video conference system 100 according to an embodiment of the present disclosure.

As shown in FIG. 7, first, a video conference sharing apparatus 130 generates a primary voice/video sharing process and the like to produce a primary voice/video sharing unit 131.

Subsequently, the first video conference system 110 requests the primary voice/video sharing unit 131 for interlinking of the video of an active speaker and synthesized voice of a plurality of speakers of the first video conference system 110.

In addition, the second video conference system 120 makes a request to the primary voice/video sharing unit 131 for interlinking of the video of an active speaker and synthesized voice of a plurality of speakers of the second video conference system 120.

Accordingly, the first video conference system 110 and the second video conference system 120 may be connected to the primary voice/video sharing unit 131 so that the first video conference system 110 and the second video conference system 120 may share the video of each active speaker and the voices of the plurality of speakers through the primary voice/video sharing unit 131.

In addition, as shown in FIG. 7, the video conference sharing apparatus 130 may generate a secondary video sharing process and the like to produce a secondary video sharing unit 132.

Then, the first video conference system 110 makes a request to the secondary video sharing unit 132 for interlinking of videos of speakers other than the active speaker of the first video conference system 110 (excluding interlinking of voice).

In addition, the second video conference system 120 makes a request to the secondary video sharing unit 132 for interlinking of videos of speakers other than the active speaker of the second video conference system 120 (excluding interlinking of voice).

Accordingly, the first video conference system 110 and the second video conference system 120 may be connected to the secondary video sharing unit 132 so the first video conference system 110 and the second video conference system 120 may share videos of speakers other than each active speaker through the secondary video sharing unit 132.

Furthermore, in the video conference system interlinking method according to an embodiment of the present disclosure, if the active speaker is changed in the second video conference system 120, video conference data interlinking with the primary voice/video interlinking unit 131 may also be changed and processed according to the changed active speaker.

Figure 8:
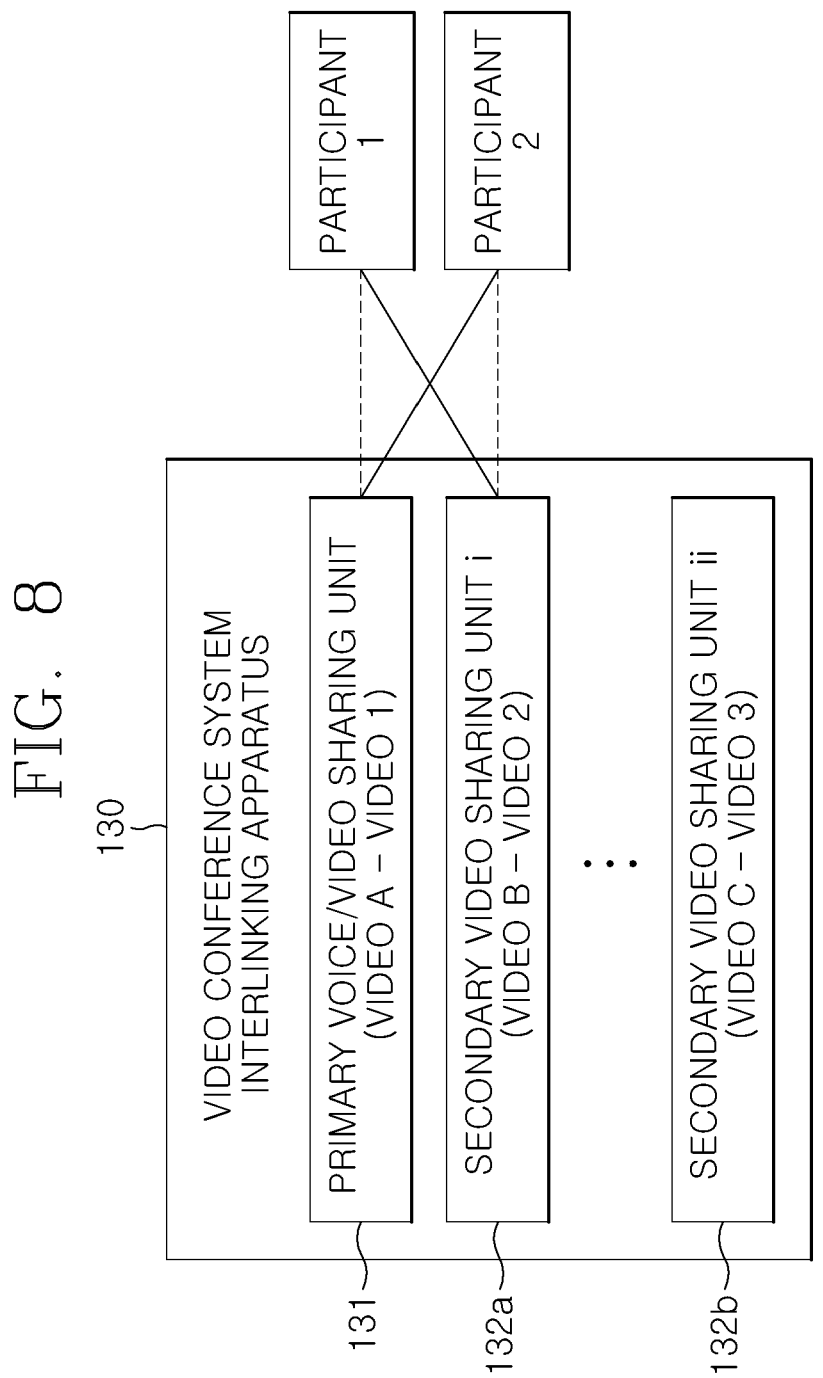

More specifically, as shown in FIG. 8, if the active speaker changes from participant 1 to participant 2, the video conference data of the active speaker transmitted to the primary voice/video sharing unit 131 may change into video conference data configured on the basis of the participant 2.

Figure 9:
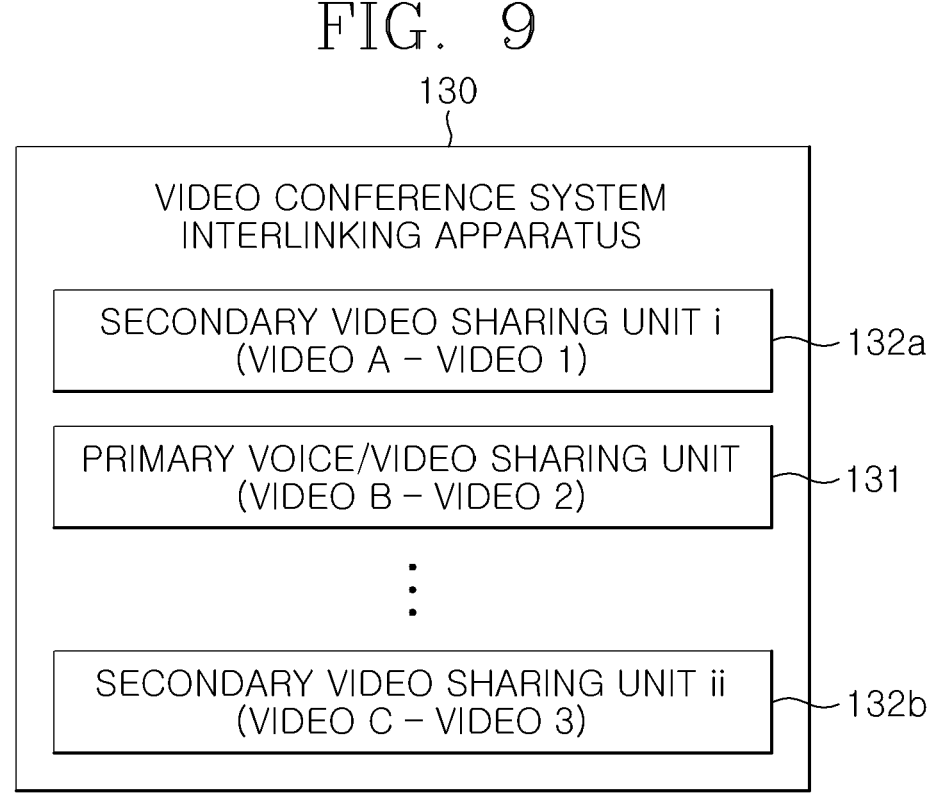

In addition, as shown in FIG. 9, in order to flexibly respond to changes in the active speaker, a plurality of video sharing units provided in the video conference system interlinking apparatus 130 may be configured such that any video sharing unit may serve as the primary voice/video sharing unit 131, and accordingly, if there is a change in the active speaker, settings for the plurality of video sharing units may be changed such that a specific video sharing unit serves as the primary voice/video sharing unit 131.

Figure 10:
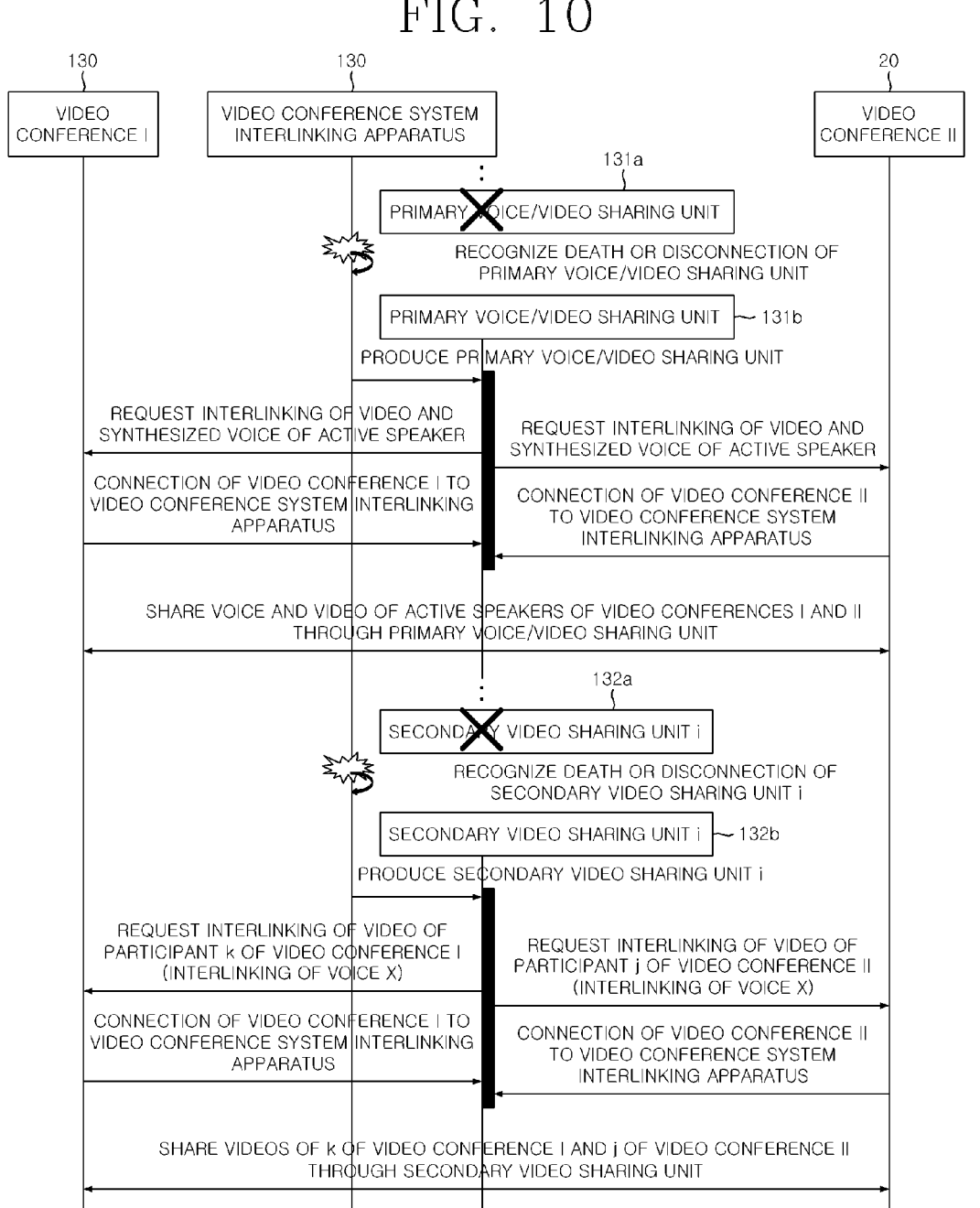

In addition, FIG. 10 illustrates a flowchart showing a specific recovery process in the case of malfunction of the primary voice/video sharing unit 131 or the secondary video sharing unit 132 of the video conference system interlinking apparatus 130 in the video conference system 100 according to an embodiment of the present disclosure.

As shown in FIG. 10, first, when the video conference sharing apparatus 130 recognizes malfunction of the primary voice/video sharing unit 131*a*, the video conference system interlinking apparatus 130 generates a new primary voice/ video sharing process and the like to reproduce a primary voice/video sharing unit 131b.

Then, the first video conference system 110 makes a request to the primary voice/video sharing unit 131b for interlinking of the video of an active speaker and synthesized voice of a plurality of speakers of the first video conference system 110.

In addition, the second video conference system 120 makes a request to the primary voice/video sharing unit 131b for interlinking of the video of an active speaker and synthesized voice of a plurality of speakers of the second video conference system 120.

Accordingly, the first video conference system 110 and the second video conference system 120 may be connected to the primary voice/video sharing unit 131b so that the first video conference system 110 and the second video conference system 120 may share the video of each active speaker and the voices of the plurality of speakers through the primary voice/video sharing unit 131b.

In addition, as shown in FIG. 10, when the video conference sharing apparatus 130 recognizes malfunction of the secondary video sharing unit 132a, the video conference sharing apparatus 130 generates a new secondary video sharing process and the like to reproduce a secondary video sharing unit 132b.

Subsequently, the first video conference system 110 makes a request to the secondary video sharing unit 132b for interlinking of videos of speakers other than the active speaker of the first video conference system 110 (excluding interlinking of voice).

In addition, the second video conference system 120 makes a request to the secondary video sharing unit 132b for interlinking of videos of speakers other than the active speaker of the second video conference system 120 (excluding interlinking of voice).

Accordingly, the first video conference system 110 and the second video conference system 120 may be connected to the secondary video sharing unit 132b so the first video conference system 110 and the second video conference system 120 may share videos of speakers other than each active speaker through the secondary video sharing unit 132b.

Through this process, even if a failure occurs in the primary voice/video sharing unit 131 or the secondary video sharing unit 132, the video conference system interlinking apparatus 130 may effectively recover the same and perform video conference interlinking.

In addition, a computer-readable storage medium according to another aspect of the present disclosure may store instructions configured to cause, when executed by a processor, an apparatus having a plurality of video sharing units including the processor to perform operations of interlinking a first video conference system and a second video conference system for combining and transmitting voice signals of a plurality of users, wherein the operations may include receiving second video conference data of a plurality of users from the second video conference system and transmitting voice data in which voices of two or more users are combined, among the transmitted second video conference data, only through one of the plurality of video sharing units. In this case, the computer program stored in the storage medium may be a computer program stored in a computer-readable storage medium in order to execute the respective operations of the video conference system interlinking method described above in a computer. Here, the computer program may be a computer program including a high-level language code that may be executed in a computer using an interpreter or the like, as well as a computer program including a machine language code generated by a compiler. In this case, the computer is not limited to a personal computer (PC), a laptop computer, or the like, and encompasses all information processing devices capable of having a central processing unit (CPU) and executing a computer program, such as servers, smartphones, tablet PCs, PDAs, mobile phones, and the like.

In addition, the computer-readable storage medium may continuously store programs executable by the computer or temporarily store the same for execution or download. In addition, the medium may be various recording means or storage means in the form of a single piece of hardware or a combination of a plurality of pieces of hardware, but is not limited to a medium directly connected to a certain computer system, and may be distributed on a network. Accordingly, the above detailed description should not be construed to be limited in all respects and should be considered as an example. The scope of the present disclosure should be determined by reasonable interpretation of the appended claims, and all changes within the equivalent scope of the present disclosure are included in the scope of the present disclosure.

Figure 11:
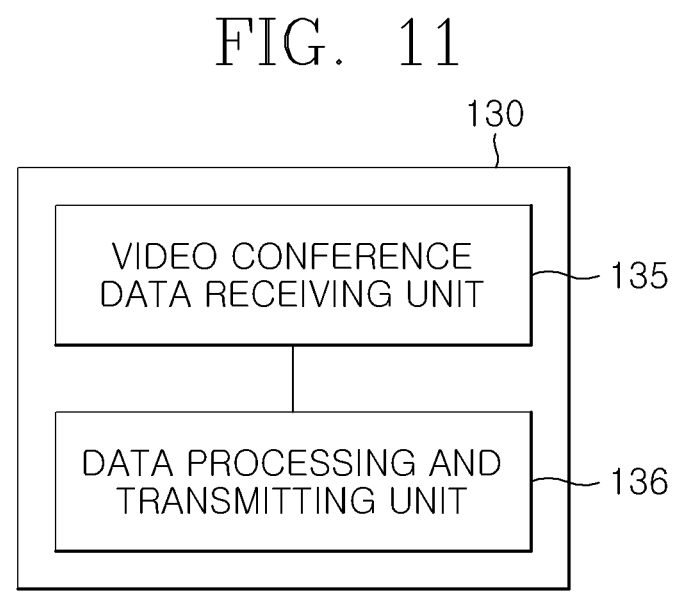

In addition, FIG. 11 illustrates a block diagram of a video conference system interlinking apparatus 130 according to an embodiment of the present disclosure.

As shown in FIG. 11, the video conference system interlinking apparatus 130 according to an embodiment of the present disclosure is a video conference system interlinking apparatus 130 that interlinks the first video conference system 110 and the second video conference system 120 for combining and transmitting voice signals of a plurality of users and includes a plurality of video sharing units, and may be configured to include a video conference data receiving unit 135 and a data processing and transmitting unit 136.

In addition, according to an embodiment of the present disclosure, the video conference system interlinking apparatus 130 may be implemented to include a computing device described below with reference to FIG. 12. For example, the processor 10 may execute an instruction configured to implement an operation for interlinking video conference systems, and the operation may include respective operations of the video conference data receiving unit 135 and the data processing and transmitting unit 136.

Hereinafter, the video conference system interlinking apparatus 130 according to an embodiment of the present disclosure will be described according to respective elements thereof. More detailed description of according to an embodiment of the present disclosure may be inferred from the description of the video conference system interlinking method according to an embodiment of the present disclosure described above, so detailed descriptions thereof will be omitted below.

First, the video conference data receiving unit 135 receives second video conference data of a plurality of users from the second video conference system.

Accordingly, the data processing and transmitting unit 136 transmits voice data obtained by combining voices of two or more users, among the transmitted second video conference data, through only one of the plurality of video sharing units.

In this case, the data processing and transmitting unit 136 in the video conference system interlinking apparatus 130 may transmit both video data and voice data of a specific user of the plurality of users, among the second video conference data, to the first video conference system 110 and transmit video data of the remaining users, among the second video conference data, to the first video conference system 110.

In addition, in the data processing and transmitting unit 136, the primary voice/video interlinking unit 131 among the plurality of video sharing units 131 and 132 may transmit video conference data including both video data and voice data of an active speaker among a plurality of users of the second video conference system 120 to the first video conference system 110, and the secondary video interlinking unit 132 among the plurality of video sharing units 131 and 132 may transmit video conference data, which includes video data of speakers other than the active speaker among the plurality of users of the second video conference system 120 and does not include voice data thereof, to the first video conference system 110.

In this case, each of the primary voice/video interlinking unit 131 and the secondary video interlinking unit 132 may serve as a video conference device 121 participating in a video conference of the second video conference system 120.

In addition, the primary voice/video interlinking unit 131 may transmit video conference data including both video data of the active speaker and voice data of the active speaker and speakers other than the active speaker of the second video conference system 120, among video conference data of the plurality of users received from the second video conference system 120, to the first video conference system 110.

In this case, the secondary video interlinking unit 132 may transmit video conference data, which includes video data of speakers other than the active speaker among the plurality of users of the second video conference system 120 and does not include voice data thereof, to the first video conference system 110.

In addition, the video conference system interlinking apparatus according to an embodiment of the present disclosure may further include a video conference data transmitting unit (not shown) that transmits first video conference data of a plurality of users provided from the first video conference system 110 in the video conference system interlinking apparatus 130.

Here, in the first video conference data transmitting unit (not shown), the primary voice/video interlinking unit 131 among the plurality of video sharing units 131 and 132 may transmit video conference data including both video data and voice data of an active speaker among the plurality of users of the first video conference system 110 to the second video conference system 120, and the secondary video interlinking unit 132 among the plurality of video sharing units 131 and 132 may transmit video conference data, which includes video data of speakers other than the active speaker among the plurality of users of the first video conference system 110 and does not include voice data thereof, to the second video conference system 120.

In addition, each of the primary voice/video interlinking unit 131 and the secondary video interlinking unit 132 may serve as a video conference device 111 participating in a video conference of the first video conference system 110.

In addition, the primary voice/video interlinking unit 131 may serve as video conference devices 111 and 121 for the active speakers of the first video conference system 110 and the second video conference system 120, and the secondary video interlinking unit 132 may serve as video conference devices 111 and 121 for speakers other than the active speaker of the first video conference system 110 and the second video conference system 120.

In addition, the primary voice/video interlinking unit 131 may transmit video conference data including both video data of the active speaker and voice data of the active speaker and speakers other than the active speaker of the first video conference system 110, among video conference data of the plurality of users received from the first video conference system 110, to the second video conference system 120.

In addition, the secondary video interlinking unit 132 may transmit video conference data, which includes video data of speakers other than the active speaker among the plurality of users of the first video conference system 110 and does not include voice data thereof, to the second video conference system 120.

In addition, if the active speaker is changed in the second video conference system 120, the video conference data interlinked with the primary voice/video interlinking unit 131 may also be changed according to the changed active speaker.

Figure 12:
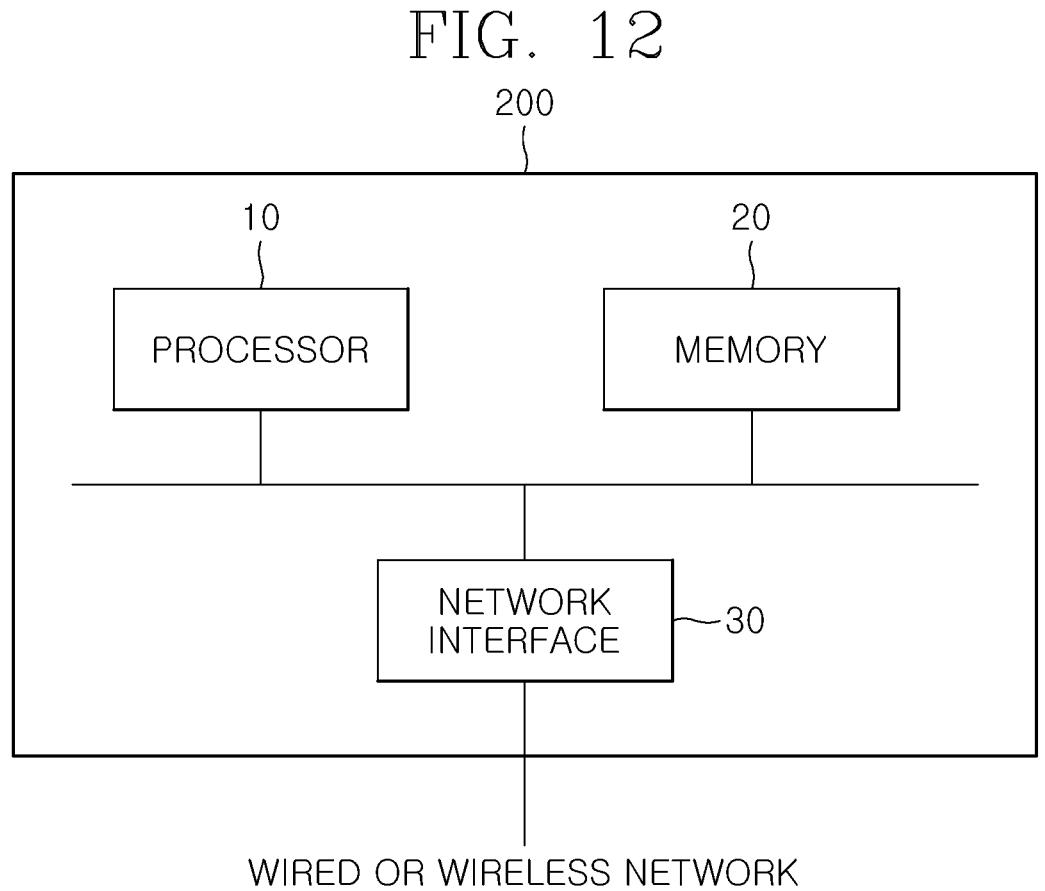
FIG. 12 is a diagram illustrating the specific configuration of a video conference system interlinking apparatus according to an embodiment of the present disclosure.

In addition, FIG. 12 illustrates an apparatus 200 to which the proposed method of the present disclosure may be applied.

Referring to FIG. 12, an apparatus 200 may be configured to implement a video conference interlinking process according to the proposed method of the present disclosure. For example, the apparatus 200 may be a server device 200 providing a video conference service.

For example, the apparatus 200 to which the proposed method of the present disclosure may be applied may include network devices such as repeaters, hubs, bridges, switches, routers, and gateways, computer devices such as desktop computers and workstations, mobile terminals such as smartphones, portable devices such as laptop computers, home appliances such as digital TVs, and mobile means such as automobiles. As another example, the apparatus 200 to which the present disclosure may be applied may be included as a part of an application specific integrated circuit (ASIC) implemented in a system-on-chip (SoC) form.

A memory 20 may be connected to a processor 10 during operation, may store programs and/or instructions for processing and control of the processor 10, may store data and information used in the present disclosure, control information required for processing data and information according to the present disclosure, temporary data generated when processing the data and information, and the like. The memory 20 may be implemented as a storage device such as a read-only memory (ROM), a random access memory (RAM), an erasable programmable read-only memory (EPROM), an electrically erasable programmable read-only memory (EEPROM), a flash memory, a static RAM (SRAM), a hard disk drive (HDD), a solid state drive (SSD), and the like.

The processor 10 may be operatively connected to the memory 20 and/or a network interface 30 and may control the operation of each module in the apparatus 200. In particular, the processor 10 may perform various control functions for performing the proposed method of the present disclosure. The processor 120 may also be called a controller, a microcontroller, a microprocessor, a microcomputer, or the like. The proposed method of the present disclosure may be implemented by hardware, firmware, software, or a combination thereof. In the case of implementing the present disclosure using hardware, an application specific integrated circuit (ASIC), a digital signal processor (DSP), a digital signal processing device (DSPD), a programmable logic device (PLD), and a field programmable gate array (FPGA), which are configured to perform the present disclosure, may be provided in the processor 10. Meanwhile, when implementing the proposed method of the present disclosure using firmware or software, the firmware or software may include instructions related to modules, procedures, or functions that perform functions or operations necessary to implement the proposed method of the present disclosure, and the instructions may be configured to be stored in the memory 20 or stored in a computer readable recording medium (not shown) separate from the memory 20 and, when executed by the processor 10, cause the apparatus 120 to perform the proposed method of the present disclosure.

In addition, the apparatus 200 may include a network interface device 30. The network interface device 30 may be connected to the processor 10 during operation, and the processor 10 may control the network interface device 30 to transmit and receive wireless/wired signals carrying information, data, signals, messages, etc. through a wireless/wired network. The network interface device 30 may support various communication standards such as, for example, IEEE 802 series, 3GPP LTE (-A), 3GPP 5G, and the like and may transmit and receive control information and/or data signals according to the communication standards. The network interface device 30 may be implemented outside the apparatus 200 as needed.

Accordingly, in the video conference system interlinking method, apparatus, system, and computer program according to an embodiment of the present disclosure, it is possible to effectively solve various problems such as limitations, errors, and the like in video and voice, which may occur when interlinking a plurality of video conference systems.

Various embodiments of the present disclosure do not list all available combinations but are for describing a representative aspect of the present disclosure, and descriptions of various embodiments may be applied independently or may be applied through a combination of two or more.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method of interlinking a first video conference system and a second video conference system for combining and transmitting voice signals of a plurality of users in a video conference system interlinking apparatus comprising a plurality of video sharing units, the method comprising:

receiving second video conference data of a plurality of users from the second video conference system; and transmitting voice data including combined voices of two or more users, among the transmitted second video conference data, through a single one of the plurality of video sharing units, wherein the second video conference data includes a combined voice signal of a plurality of users of the second video conference system, wherein the transmitting comprises:

transmitting second active speaker video conference data including video data of an active speaker and the combined voice signal, which includes voice data of the active speaker and all of speakers other than the active speaker of the second video conference system to the first video conference system; and transmitting second additional user video conference data including video data of one or more of the speakers other than the active speaker to the first video conference system.

2. The video conference system interlinking method of claim 1, wherein the transmitting comprises:

transmitting both video data and voice data of a specific user of the plurality of users, among the second video conference data of, to the first video conference system, and transmitting video data of remaining users, among the second video conference data, to the first video conference system.

3. The video conference system interlinking method of claim 1, wherein the transmitting comprises:

transmitting second active speaker video conference data including video data and voice data of an active speaker among the plurality of users of the second video conference system to the first video conference system by a primary voice/video interlinking unit among the plurality of video sharing units; and transmitting second additional user video conference data, the second additional user video conference data including video data of speakers other than the active speaker among the plurality of users of the second video conference system and does not comprise voice data thereof, to the first video conference system by a secondary video interlinking unit among the plurality of video sharing units.

4. The video conference system interlinking method of claim 3, wherein each of the primary voice/video interlinking unit and the secondary video interlinking unit serves as a video conference device participating in a video conference of the second video conference system.

5. The video conference system interlinking method of claim 3, further comprising:

transmitting, by the primary voice/video interlinking unit, second combined video conference data including the video data and voice data of the active speaker and second additional video data and audio data of speakers other than the active speaker of the second video conference system, among the second video conference data, to the first video conference system.

6. The video conference system interlinking method of claim 5, further comprising transmitting, by the secondary video interlinking unit, secondary additional video conference data, the secondary additional video conference data including video data of speakers other than the active speaker among the plurality of users of the second video conference system and does not comprise voice data thereof, to the first video conference system.

7. The video conference system interlinking method of claim 3, wherein, when the active speaker is changed in the second video conference system, the second active speaker video conference data interlinked with the primary voice/video interlinking unit is also changed according to the changed active speaker.

8. The video conference system interlinking method of claim 1, further comprising:

transmitting, by the video conference system interlinking apparatus, first video conference data of a plurality of users provided from the first video conference system.

9. The video conference system interlinking method of claim 8, wherein the transmitting of the first video conference data comprises:

transmitting first active video conference data including video data and voice data of an active speaker among the plurality of users of the first video conference system to the second video conference system by a primary voice/video interlinking unit among the plurality of video sharing units; and transmitting first additional video conference data, the first additional video conference data including video data of speakers other than the active speaker among the plurality of users of the first video conference system and does not comprise voice data thereof, to the second video conference system by a secondary video interlinking unit among the plurality of video sharing units.

10. The video conference system interlinking method of claim 9, wherein, in the transmitting of the first additional video conference data, the speakers other than the active speaker among the plurality of users of the first video conference system are muted.

11. The video conference system interlinking method of claim 9, wherein the primary voice/video interlinking unit serves as a first active video conference device for active speakers of the first video conference system and the second video conference system, and wherein the secondary video interlinking unit serves as a first additional video conference device for speakers other than the active speakers of the first video conference system and the second video conference system.

12. The video conference system interlinking method of claim 9, further comprising:

transmitting first combined video conference data, by the primary voice/video interlinking unit, the first combined video conference data including the video data and voice data of the active speaker and first additional video data and voice data of speakers other than the active speaker of the first video conference system, among the first video conference data, to the second video conference system.

13. The video conference system interlinking method of claim 12, further comprising:

transmitting, by the secondary video interlinking unit, first additional speaker video conference data, the first additional speaker video conference data including video data of speakers other than the active speaker among the plurality of users of the first video conference system and does not comprise voice data thereof, to the second video conference system.

14. A non-transitory, computer-readable storage medium storing instructions that, when executed by one or more processors, configure the one or more processors to perform instructions, wherein one or more of the processors are provided in an apparatus comprising a plurality of video sharing units where the included one or more processors perform operations of interlinking a first video conference system and a second video conference system for combining and transmitting voice signals of a plurality of users, and wherein the instructions further comprise:

receiving second video conference data of a plurality of users from the second video conference system; and transmitting voice data including combined voices of two or more users, among the transmitted second video conference data, through a single one of the plurality of video sharing units, wherein the second video conference data includes a combined voice signal of a plurality of users of the second video conference system, wherein the transmitting comprises:

transmitting second active speaker video conference data including video data of the active speaker and the combined voice signal, which includes voice data of the active speaker and all of speakers other than the active speaker of the second video conference system to the first video conference system; and transmitting second additional user video conference data including video data of one or more of the speakers other than the active speaker to the first video conference system.

15. A video conference system interlinking apparatus comprising:

one or more processors configured to execute instructions; and a memory storing the instructions, wherein the apparatus is configured to interlink a primary video conference system and a secondary video conference system for combining and transmitting voice signals of a plurality of users, and comprising a plurality of video sharing units, and wherein the processor is configured to execute the instructions, comprising:

receiving second video conference data of a plurality of users from the secondary video conference system; and transmitting voice data including combined voices of two or more users, among the transmitted second video conference data, through a single one of the plurality of video sharing units, wherein the second video conference data includes a combined voice signal of a plurality of users of the second video conference system, wherein the transmitting comprises:

transmitting second active speaker video conference data including video data of an active speaker and the combined voice signal, which includes voice data of the active speaker and all of speakers other than the active speaker of the second video conference system to the first video conference system; and transmitting second additional user video conference data including video data of one or more of the speakers other than the active speaker to the first video conference system.

16. The video conference system interlinking apparatus of claim 15, further comprising:

a primary voice/video interlinking unit among the plurality of video sharing units, the primary voice/video interlinking unit being configured to transmit primary video conference data including primary active video data and voice data of an active speaker among the plurality of users of the primary video conference system to the secondary video conference system; and a secondary video interlinking unit among the plurality of video sharing units, the secondary video interlinking unit being configured to transmit secondary video conference data, the secondary video conference data including second additional video data of speakers other than the active speaker among the plurality of users of the second video conference system and does not comprise voice data thereof, to the primary video conference system.

17. The video conference system interlinking apparatus of claim 16, wherein each of the primary voice/video interlinking unit and the secondary video interlinking unit serves as a video conference device participating in a video conference of the primary video conference system.

18. The video conference system interlinking apparatus of claim 16, wherein the primary voice/video interlinking unit is configured to transmit primary combined video conference data including video data and voice data of the active speaker and voice data of speakers other than the active speaker of the primary video conference system, among primary video conference data of the plurality of users received from the primary video conference system, to the secondary video conference system.

19. The video conference system interlinking apparatus of claim 18, wherein the primary video interlinking unit is configured to transmit primary additional video conference data including video data of speakers other than the active speaker among the plurality of users of the primary video conference system and does not comprise voice data thereof, to the secondary video conference system.

20. The video conference system interlinking apparatus of claim 15, wherein the instructions further comprise:

receiving primary video conference data of a plurality of users from the primary video conference system.

* * * * *